US 8,700,468 B2

(12) United States Patent
Chang et al.

(10) Patent No.: US 8,700,468 B2
(45) Date of Patent: Apr. 15, 2014

(54) MICRO-SEGMENT DEFINITION SYSTEM

(75) Inventors: Walter Chang, San Jose, CA (US);
Geoff Baum, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 131 days.

(21) Appl. No.: 13/039,207

(22) Filed: Mar. 2, 2011

(65) Prior Publication Data

US 2012/0226560 A1   Sep. 6, 2012

(51) Int. Cl.
*G06Q 30/00*   (2012.01)
*G06Q 30/02*   (2012.01)

(52) U.S. Cl.
CPC ........ *G06Q 30/0269* (2013.01); *G06Q 30/0254* (2013.01); *G06Q 30/0251* (2013.01); *G06Q 30/0241* (2013.01)
USPC .................. 705/14.66; 705/14.52; 705/14.49; 705/14.4

(58) Field of Classification Search
CPC .......................... G06Q 30/0242; G06Q 3/0269
USPC .................. 705/14.41, 14.43, 14.52
See application file for complete search history.

(56) References Cited

U.S. PATENT DOCUMENTS

| | | | |
|---|---|---|---|
| 5,636,346 A * | 6/1997 | Saxe ............................. | 705/1.1 |
| 5,892,900 A | 4/1999 | Ginter et al. | |
| 6,061,658 A * | 5/2000 | Chou et al. ................... | 705/7.33 |
| 6,317,872 B1 | 11/2001 | Gee et al. | |
| 6,519,571 B1 * | 2/2003 | Guheen et al. ............. | 705/14.66 |
| 7,072,858 B1 * | 7/2006 | Litzow et al. ................ | 705/7.35 |
| 7,174,381 B2 | 2/2007 | Gulko et al. | |
| 7,224,185 B2 | 5/2007 | Campbell et al. | |
| 7,599,851 B2 | 10/2009 | Frengut et al. | |
| 7,992,171 B2 | 8/2011 | Amidon et al. | |
| 2001/0013009 A1 * | 8/2001 | Greening et al. ............... | 705/10 |
| 2001/0032128 A1 | 10/2001 | Kepecs | |
| 2003/0023482 A1 | 1/2003 | Messner et al. | |
| 2005/0114366 A1 | 5/2005 | Mathai et al. | |
| 2006/0095327 A1 | 5/2006 | Vaughn et al. | |
| 2006/0212355 A1 | 9/2006 | Teague et al. | |
| 2007/0230706 A1 | 10/2007 | Youn | |
| 2008/0090513 A1 | 4/2008 | Collins et al. | |
| 2008/0103903 A1 * | 5/2008 | Flake et al. ...................... | 705/14 |
| 2008/0163071 A1 | 7/2008 | Abbott et al. | |
| 2009/0132275 A1 * | 5/2009 | Jung et al. ......................... | 705/2 |
| 2009/0164441 A1 | 6/2009 | Cheyer | |
| 2009/0271263 A1 | 10/2009 | Regmi et al. | |
| 2010/0042471 A1 | 2/2010 | Chang et al. | |
| 2010/0094878 A1 | 4/2010 | Soroca et al. | |

(Continued)

OTHER PUBLICATIONS de Haan et al., "Nulls: Nothing to Worry About", Oracle Magazine, Jul. 2005.*

(Continued)

*Primary Examiner* — John G Weiss
*Assistant Examiner* — Scott C Anderson
(74) *Attorney, Agent, or Firm* — Wolfe-SBMC

(57) ABSTRACT

A selection of one or more segment attributes from an offer provider campaign is received at a graphical user interface. The one or more segment attributes define one or more segments that correspond to one or more offers in the offer provider campaign. Further, an expression graph based on the one or more segment attributes is generated. In addition, a portable micro-segment object is generated based on the expression tree such that the portable micro-segment object lacks dependence on the offer provider campaign.

20 Claims, 10 Drawing Sheets

(56) References Cited

U.S. PATENT DOCUMENTS

| | | |
|---|---|---|
| 2010/0106568 A1 | 4/2010 | Grimes |
| 2010/0138867 A1 | 6/2010 | Wong et al. |
| 2010/0211464 A1 | 8/2010 | Zhu et al. |
| 2010/0268600 A1 | 10/2010 | Banko et al. |
| 2012/0226559 A1 | 9/2012 | Baum et al. |
| 2012/0226562 A1 | 9/2012 | Baum et al. |
| 2012/0226697 A1 | 9/2012 | Chang et al. |
| 2012/0226700 A1 | 9/2012 | Chang et al. |
| 2013/0132220 A1 | 5/2013 | Baum |
| 2013/0132365 A1 | 5/2013 | Chang |

OTHER PUBLICATIONS functionx.com/sql/lesson01.htm, copyright 2004-2007 to FunctionX, Inc.*

"Lawson M3 Fact Sheet", Copyright 2008 to Lawson Software, Inc.5636346.*

Preiss, "Data Structures and Algorithms with Object-Oriented Design Patterns in Java", John Wiley & Sons, Inc., 1998, p. 264.*

Lam, "The Behavior of NULLs in SQL", Stanford University Department of Computer Science, Aug. 5, 2004, found on line at www-cs-students.stanford.edu/~wlam/compsci/sqlnulls.*

Dattero et al., "Programming languages and gender", Communications of the ACM, VOl. 47, No. 1, Jan. 2004, pp. 99-102.*

Non-Final Office Action, U.S. Appl. No. 12/862,386, (Oct. 9, 2012), 8 pages.

Non-Final Office Action, U.S. Appl. No. 13/039,177, (Sep. 10, 2012), 19 pages.

Non-Final Office Action, U.S. Appl. No. 13/039,242, (Jun. 8, 2012), 10 pages.

Non-Final Office Action, U.S. Appl. No. 13/039,257, (Jul. 18, 2012), 10 pages.

Non-Final Office Action, U.S. Appl. No. 13/153,328, (Jun. 8, 2012), 8 pages.

Final Office Action, U.S. Appl. No. 13/039,177, (Dec. 12, 2012), 20 pages.

Final Office Action, U.S. Appl. No. 13/039,242, (Jan. 2, 2013), 12 pages.

Final Office Action, U.S. Appl. No. 13/039,257, (Jan. 3, 2013), 12 pages.

Final Office Action, U.S. Appl. No. 13/153,328, (Dec. 3, 2012), 14 pages.

Non-Final Office Action, U.S. Appl. No. 13/039,266, (Mar. 12, 2013), 12 pages.

Non-Final Office Action, U.S. Appl. No. 13/153,328, (Mar. 20, 2013), 13 pages.

Final Office Action, U.S. Appl. No. 12/862,386, (Mar. 26, 2013), 11 pages.

Final Office Action, U.S. Appl. No. 12/862,386, (Apr. 9, 2013), 12 pages.

Final Office Action, U.S. Appl. No. 12/862,386, (Jun. 26, 2013), 13 pages.

Final Office Action, U.S. Appl. No. 13/039,266, (Aug. 5, 2013), 14 pages.

Notice of Allowance, U.S. Appl. No. 13/039,177, (Sep. 4, 2013), 7 pages.

Notice of Allowance, U.S. Appl. No. 13/039,257, (Sep. 12, 2013), 14 pages.

Notice of Allowance, U.S. Appl. No. 13/153,328, (Sep. 4, 2013), 7 pages.

Wen-Xiu, et al., "Market basket analysis based on text segmentation and association mining", *First International Conference on Networking and Distributed Computing*, (Oct. 2010), pp. 309-313.

\* cited by examiner

```
"TED_2011": {
  "Seg_Properties": {
    "Seg_Variables": {
      "ExampleUser": "Example user attributes",
      "ExamplCore": "Example core attributes"
    },
    "Seg_Description": "Segment for TED home energy monitoring products",
    "Seg_Name": "TED_Market",
    "Seg_Audience": "GENERIC",
    "Seg_Code": "TED_2011"
  },
  "Seg_PartyDef": {
    "Seg_PartyCampTax": "Default",
    "Seg_PartyName": "Energy Inc.",
    "Seg_PartyCode": "EI"
  },
  "Seg_Evaluation": {
    "Seg_Expression":
      "(
        (ExampleUser.zipcode in [94301, 94302, 94303, 94304, 94306, 94309]) or
        (ExampleUser.zipcode between (94085, 94089)) or
        (ExampleUser.zipcode between (95050, 95056)) or
        (ExampleUser.zipcode between (95010, 95196))
      ) and
      (
        (EampleCore.Gender == 'M') and
        (EampleCore.Income between(50000,100000)) and
        (DataProvider1Data.MonthlyPowerBill >= 200)
      ) or
      (ExampleWish.ProductCategory in ["Green Electronics", "Power Conservation"]) or
      (ExampleBran.BrandName in ["P3 International", "Brand XYZ"])
      "
  }
}
```

```
(ExampleUser.zipcode in [ 94301, 94302, 94303, 94304, 94306, 94309] ) or
(ExampleUser.zipcode between (94085, 94089)) or
(ExampleUser.zipcode between (95050, 95056)) or
(ExampleUser.zipcode between (95010, 95196))
and
(
  (ExampleCore.Gender == 'M') and
  (ExampleCore.Income between(50000,100000)) and
  (DataProvideriData.MonthlyPowerBill >= 200)
)
or
(ExampleWish.ProductCategory in ["Green Electronics",
                                 "Power Conservation"]) or
(ExampleBran.BrandName in ."P3 International", "Brand XYZ" ])
```

*Figure 7*

MICRO-SEGMENT DEFINITION SYSTEM

BACKGROUND

1. Field

This disclosure generally relates to classification of consumers. More particularly, the disclosure relates to defining micro-segments of consumers.

2. General Background

Content providers, merchants, and marketers have to precisely define and target highly specific market segments in order to effectively deliver the most relevant online content. Examples of the most relevant online content are advertising, offers, entertainment, news, etc.

A micro-segment is a precise division of a market or population that is typically identified by marketers through advanced technology and techniques. For example, data mining, artificial intelligence, and various algorithms may be utilized. These technologies and techniques are utilized to group consumers into fine-grained segments by recognizing and predicting minute consumer spending and behavioral patterns, i.e., micro-segmentation. In other words, a micro-segment is a group of (purchase) decision makers who share similar attributes, purchase behavior, and/or level of interest in a specific set of features. In the current environment, however, classifying and segmenting a new user community into micro-segments may be difficult for a number of reasons. In particular, consumers are increasingly filtering content and marketing messages, which reduces marketer efficacy. Further, even as more consumer data and behaviors are collected, most are under-utilized because of the lack of industry expertise and limitations of available technology. In addition, meaningful segmentation within newly created user communities and populations is difficult.

Further, segmentation difficulties also affect numerous websites that leverage the recorded behaviors of large numbers of site users in determining recommended content, products, and services for various user segments. Recommendation systems utilize algorithms that may vary from k-nearest neighbor approaches to preference/interest/taste similarity methods, e.g., found by using Pearson Correlation, to collaborative filtering algorithms, e.g., people who buy X also buy Y. A challenge with all of these approaches is having an accurate segmentation of very large user populations based on recorded preferences and behaviors before the system can make recommendations.

SUMMARY

In one aspect of the disclosure, a computer program product is provided. The computer program product includes a computer useable medium having a computer readable program. The computer readable program when executed on a computer causes the computer to receive a selection of one or more segment attributes from an offer provider campaign. The one or more segment attributes define one or more segments that correspond to one or more offers in the offer provider campaign. Further, the computer readable program when executed on the computer causes the computer to generate a expression graph based on the one or more segment attributes. In addition, the computer readable program when executed on the computer causes the computer to generate a portable micro-segment object based on the expression tree such that the portable micro-segment object lacks dependence on the offer provider campaign.

In another aspect of the disclosure, a process is provided. The process receives a selection of one or more segment attributes from an offer provider campaign. The one or more segment attributes define one or more segments that correspond to one or more offers in the offer provider campaign. Further, the process generates a expression graph based on the one or more segment attributes. In addition, the process generates a portable micro-segment object based on the expression tree such that the portable micro-segment object lacks dependence on the offer provider campaign.

In yet another aspect of the disclosure, a system is provided. The system includes a reception module that receives a selection of one or more segment attributes from an offer provider campaign. The one or more segment attributes define one or more segments that correspond to one or more offers in the offer provider campaign. Further, the system includes a processor that generates a expression graph based on the one or more segment attributes and a portable micro-segment object based on the expression tree such that the portable micro-segment object lacks dependence on the offer provider campaign.

DRAWINGS

The above-mentioned features of the present disclosure will become more apparent with reference to the following description taken in conjunction with the accompanying drawings wherein like reference numerals denote like elements and in which:

FIG. 5A illustrates an example of code 500 for the written form of the expression.

FIG. 7 illustrates an example of code that may be utilized for the expression tree illustrated in FIG. 6.

DETAILED DESCRIPTION

Figure 1:
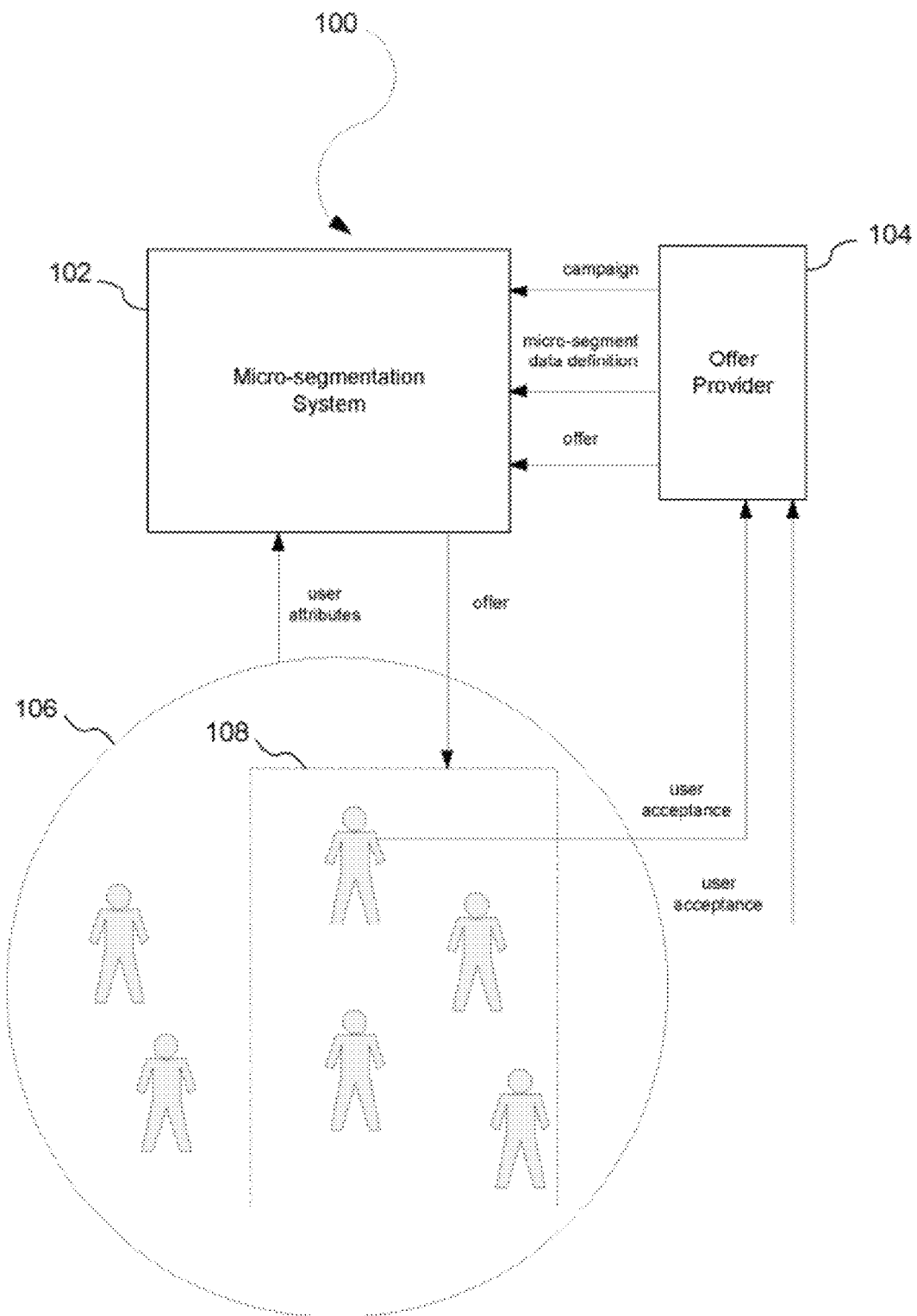
FIG. 1 illustrates a micro-segmentation system configuration.

A micro-segmentation definitional method, system, and computer program product are provided to define a micro-segment object. In one embodiment, demographic attributes and behavioral interests of a user are generalized. A segment has a collection of attribute comparison predicates, e.g., Gender=Male, connected by Boolean AND/OR operators, e.g., (Gender=Male) AND (Age between (20,30)). Accordingly, if a quantity n total data attributes are available, then the number of micro-segments may equal $2^n-1$, i.e., the total combination of n attributes. The micro-segment objects allow marketers to define micro-segments from this large space of attributes. Those generalized demographic attributes and behavioral interest are then encapsulated into an object. The behavioral interests may include both positive and negative interests, which allows creation of a comprehensive affinity model. An example of positive or negative interests is likes or dislikes of a brand. In addition, the object supports any complex attribute or interest rule structure that is represented as a expression tree. Attributes and predicate expressions for matching and recommendations may then be developed for that expressions tree. Predicates can be connected through conjunctive operators and/or disjunctive operators to create arbitrarily complex micro-segment expressions.

The micro-segment object is portable. In other words, the micro-segment is not hardwired to a particular marketing campaign. The micro-segment is reusable. Accordingly, the micro-segment object provides portable analytics without specific details. In one embodiment, the micro-segment is an opaque encoding of a set of attributes common to a population of consumers. For example, a micro-segment including males ages twenty-five with income between eighty thousand dollars to one hundred thousand dollars, and with an interest in sports cars may be encoded as SEG-XYZ. New consumers assigned into segment SEG-XYZ will by definition have the same listed attributes. Given a larger population of consumers with other micro-segments, marketers that share micro-segment definitions and data may perform analytics utilizing the SEG-XYZ encoding without revealing to others the actual definition of the micro-segment. A micro-segment definition is portable as a micro-segment that was successful for one marketer may be shared and utilized by another marketer. The analytics themselves may be performed in a private manner in which the attributes are not revealed to other parties. This configuration is useful in cases when marketers have made prior agreements to share segment definitions and micro-segment consumer data.

Numerous high-value micro-segments within newly created user communities may be identified and created. Advertisers and marketers can automate the creation of customized micro-segments to which they can deliver highly targeted and relevant content across a range of multimedia devices. After the micro-segments are identified, they can be utilized to automate the delivery of content, personalized direct micro-marketing, and micro-promotion campaigns, which target and appeal to the specified tastes, needs, wants, and desires of the member individuals. Micro-marketing is the process by which the system models each consumer as having different ideas and feelings about a company's products, services, prices, and promotions, and appeals to them in an appropriate manner. A consumer refers to a user who is a consumer and utilizes the configurations provided for herein. The micro-segments provide a finer level of granularity than segments. Accordingly, the micro-segments may assist marketers in recognizing and predicting minute consumer spending and behavioral patterns. For example, the micro-segments may be utilized to leverage data sources such as core demographics, category spending over time, fine-grained purchase history, and buying intent. Some of these data sources such as purchase history and category spending may be validated as they are coming from third parties, e.g., credit card companies. As a result, marketers are able to provide more accurate, precise, and targeted offers.

Further, membership within micro-segments may be incrementally and continuously updated within micro-segments. In addition, intentional semantics may be automatically detected and inferred utilizing additionally analytics. For example, if a consumer belongs to a high-end car interest segment, a high-end camera interest segment, and a high-end watch segment, the system may infer that if the consumer has expressed a generic interest in shirts, the consumer may additionally fit into a high-end shirt interest segment.

Further, recommendations may be quickly and accurately generated regarding content, products and services to users within each micro-segment. A recommendation system may be utilized to perform the recommendations. The recommendation system is a system that employs information clustering and filtering techniques that attempt to recommend information content or product items that are likely to be of interest to a specific user (consumer) based on the cluster or segment he or she is in. In one embodiment, a recommendation system compares a user's behaviors and/or explicit profile to some reference characteristics and then seeks to predict the interest 'rating' that a user would give to an item they may have not yet considered. These characteristics may be from the information or product item (using a content-based and/or attribute approach) or the user's social environment (using collaborative filtering approaches).

In one embodiment, each micro-segment includes a specific set of key discriminating features ("KDFs") that defines a group of attributes utilized by decision makers and a volume or value figure to indicate the micro-segment size. FIG. 1 illustrates a micro-segmentation system configuration 100. The micro-segmentation system configuration 100 has a micro-segmentation system 102 that is a third-party trusted system between a merchant 104 and each of a plurality of users 106. The offer provider 104 may be a company selling a product, a company selling a service, a marketing company, an advertising company, or the like that provides a campaign to the micro-segmentation system. The campaign indicates a set of target attributes that the offer provider is looking for in marketing to particular users for a product or service. The campaign may include one or more offers. Accordingly, the set of target attributes refers to the set of attributes the campaign is targeting. As an example, the campaign may be an offer for sale of men's sneakers in the United States of America. The micro-segmentation system 102 receives that campaign and also receives user attributes from the plurality of users 106. The attributes are properties or characteristics. An example of an attribute is gender. Accordingly, the values for the gender attribute may be male or female. The micro-segmentation system 102 then performs a determination of which users in the plurality of users 106 have user attribute values that match the target attributes of the campaign. In other words, the micro-segmentation system 102 evaluates the created micro-segment definitions, attributes values, and value distributions to determine the selectivity of the specific micro-segment. The micro-segmentation system 102 determines a micro-segment 108 that includes users that match the target attributes of the campaign. In one embodiment, all of the target attributes have to equal the user attributes in order for the user to be placed into the micro-segment 108. In another embodiment, a minimum matching score has to be met for the user to be placed into the micro-segment 108. As an example, a user may not have to match all of the attributes, but may match enough of the attributes to generate a score that exceeds the offer provider's minimum threshold and places the consumer in to micro-segment 108. In another embodiment, a weighting mechanism is utilized to weigh certain attributes as opposed to other attributes in the scoring methodology. For example, an age attribute may have a higher weighting in the scoring calculation than a geographic attribute. In one embodiment, the system compensates for attribute bias to prevent attribute overweighting. Similarly, marketers may be allowed to customize the weightings of micro-segment attributes in determining the selectivity of the micro-segment relative to candidate users.

In one embodiment, after the micro-segmentation system 102 automatically classifies users into the micro-segment 108, the micro-segmentation system 102 sends a micro-segment data definition to the offer provider 104. In one embodiment, the micro-segmentation system 102 captures default definitions and/or training data for classifying existing and/or new users. The quantity of segment definitions may range anywhere from a few to billions based upon the number of ways user attributes are combined and utilized. In another embodiment, that micro-segment data definition does not include personal identity information of the users in the micro-segment. In other words, the plurality of users provide attribute information to the micro-segmentation system 102 on a trusted basis such that the micro-segmentation system does not send information that personally identifies the users to the offer provider 104. The system may not send any data to the offer provider other than representative statistics or general statistics about the micro-segment they defined. As an example, a micro-segment may contain twenty-seven thousand three hundred thirty-two consumers. After the offer has been delivered, seventeen thousand three hundred forty-four consumers looked at the offer, three thousand four hundred forty-four consumers clicked on the offer to learn more, and six hundred thirty-four consumers purchased the offer. Further, in one embodiment, the plurality of users 106 provides permission to the micro-segmentation system 102 to send them offers. The micro-segment data definition received by the offer provider 104 provides information such as the number of users in the micro-segment, their attribute values, etc. The offer provider 104 can quickly determine potential interest in a campaign among a target audience, without wasting advertising and resources on people who have no interest in receiving advertising for this specific campaign. As a result, the offer provider 104 can realistically determine if the campaign is economically feasible and the amount of resources that should be dedicated to the campaign, etc. The offer provider can then send an offer to the micro-segmentation system 102 based on the micro-segment data. In other words, the offer provider 104 is not sending the offer directly to the micro-segment 108. After receiving the offer, the micro-segmentation system may then send the offer to the micro-segment. If users in the micro-segment would like to learn more about the offer or accept the offer, the users may then individually contact the offer provider by following a link or some other response mechanism provided in the offer. In another embodiment, micro-segment data other than the micro-segment data definition may also be sent to the offer provider 104. As an example, campaign performance statistics may be sent to the offer provider after the delivery of the campaign in addition to the micro-segment data definition.

In one embodiment, the micro-segmentation system 102 also performs recommendations. The micro-segmentation system 102 may deliver a recommendation to the user. In one embodiment, given any user, the micro-segmentation system 102 quickly locates all assigned micro-segments and then utilizes the assigned micro-segments to locate product, service, and/or content offers based on the matching micro-segments to generate specific recommendations. Further, the micro-segmentation system 102 may store data regarding the recommendations upon which the user acts.

In one embodiment, before each user is classified, that user is scored against all relevant micro-segments to determine the most probable classifications. Further, micro-segment classifications may be efficiently assigned to users and searchable in real-time.

Figure 2:
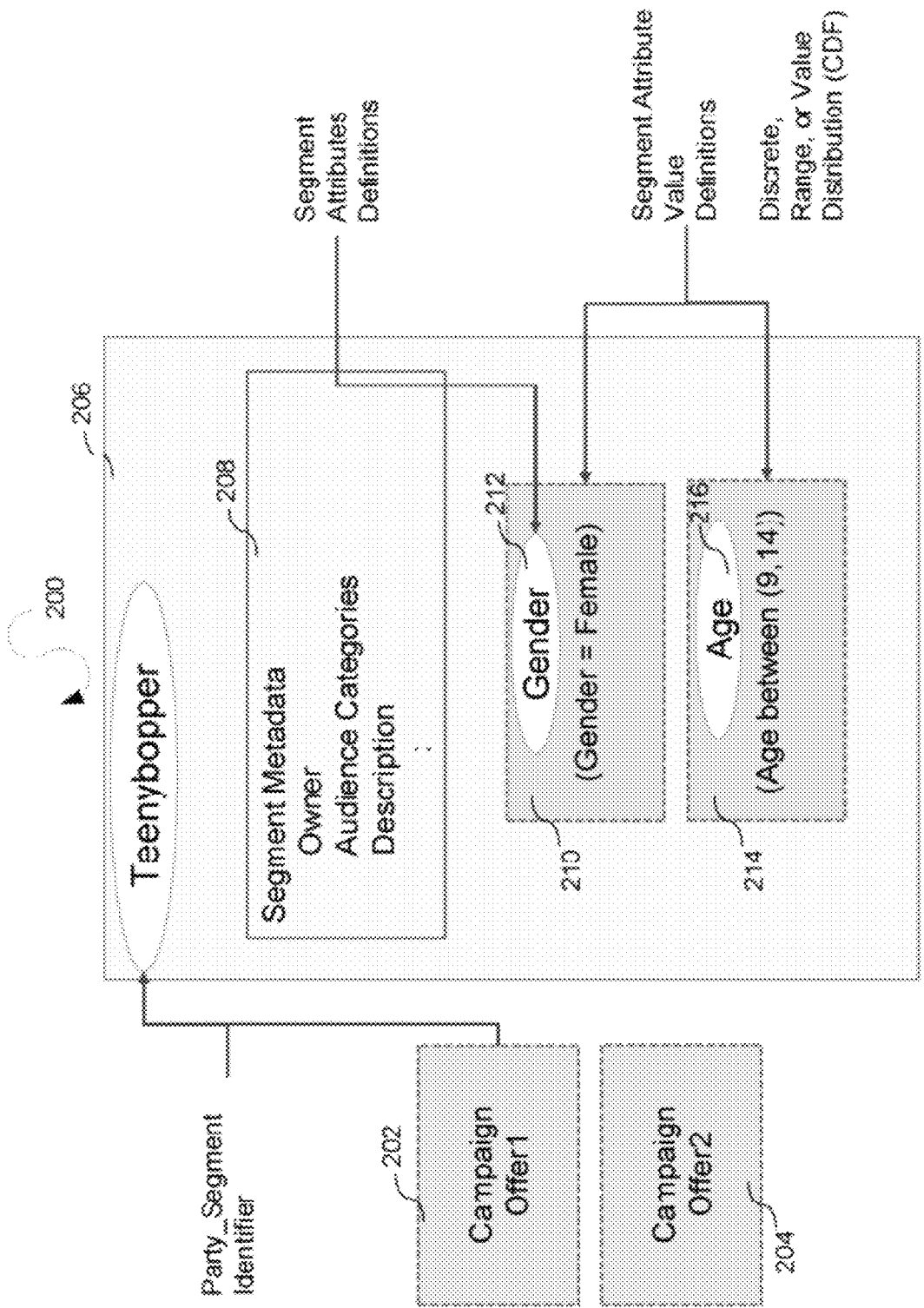
FIG. 2 illustrates a micro-segment definition and structure.

FIG. 2 illustrates a micro-segment definition and structure 200. The micro-segment definition and structure 200 has a micro-segment object 206 that may receive a campaign offer such as the first campaign offer 202 and/or the second campaign offer 204. For illustrative purposes, the micro-segment object 206 receives the first campaign offer 202. As an example, the micro-segment object 200 may receive a party_segment identifier that identifies a target party of the first campaign offer 202. For instance, the party_segment identifier may be "Teenybopper." The micro-segment object may also have segment metadata 208 that includes metadata about the segment. For example, the segment metadata 208 may have an owner name, audience categories, description of the segment, etc. The micro-segment object 206 may also have one or more segment definitions. For example, the micro-segment object 206 may have a gender segment attribute definition 212 and an age segment attribute definition 216. The micro-segment object 206 may also have segment attribute value definitions for the respective segment attribute definitions. For example, a gender segment attribute value definition 210 may equal female and an age segment attribute value definition may equal an age between nine and fourteen. Various distributions such a discrete distribution, a range distribution, or a value distribution such as Cumulative Distribution Function ("CDF") may be utilized.

Figure 3:
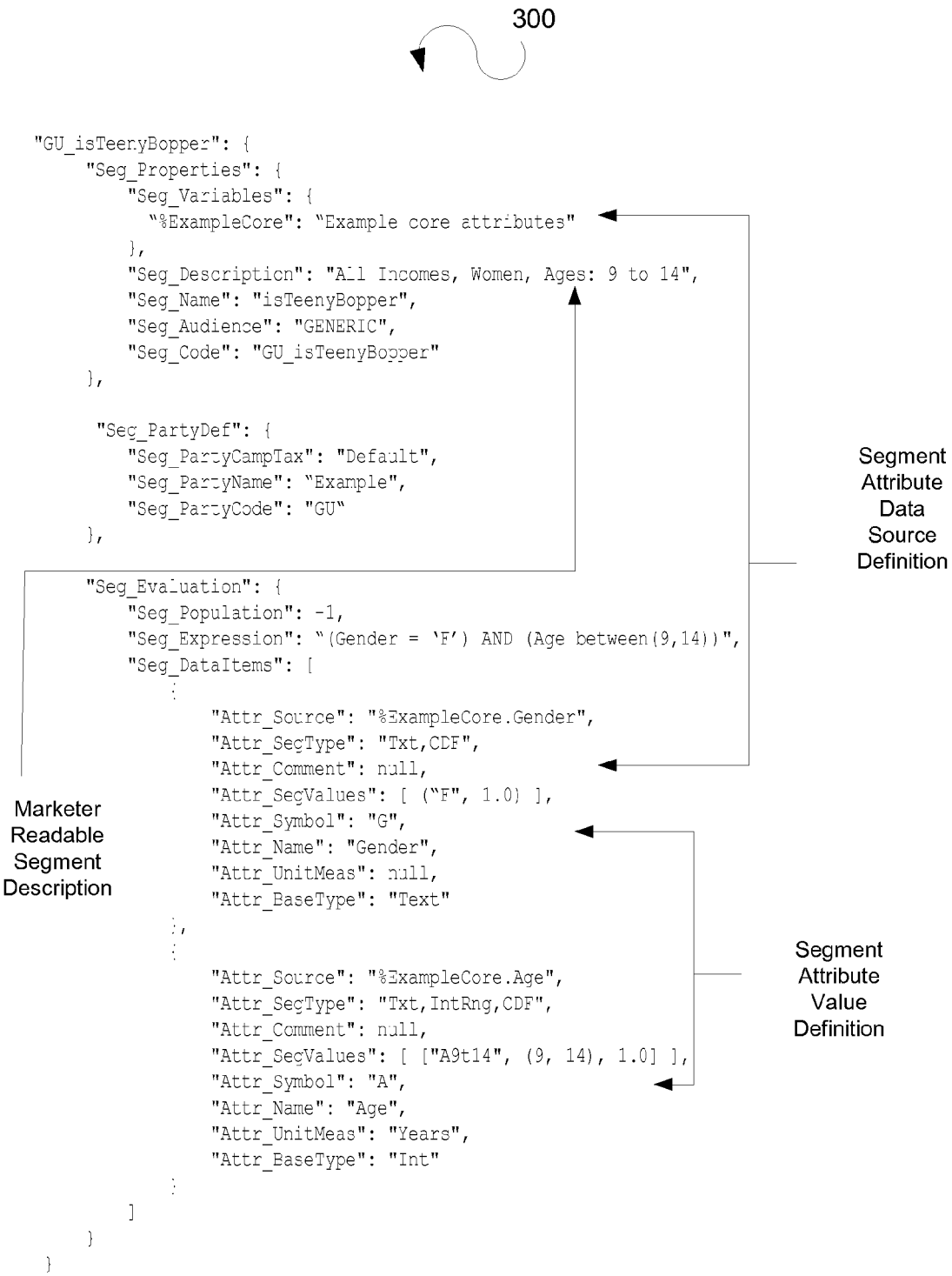
FIG. 3 illustrates an example of micro-segment definition code.

FIG. 3 illustrates an example of micro-segment definition code 300. A party_segment name portion may provide the party_segment name. As an example, the party_segment name may be "TeenyBopper." Further, a segment attribute data source definition may define the segment attribute data sources, e.g., gender. Further, a marketer readable segment description may provide a marketing description, e.g., "All Incomes, Women, Ages: 9 to 14." Further, segment attribute value definitions may be provided.

Figure 4:
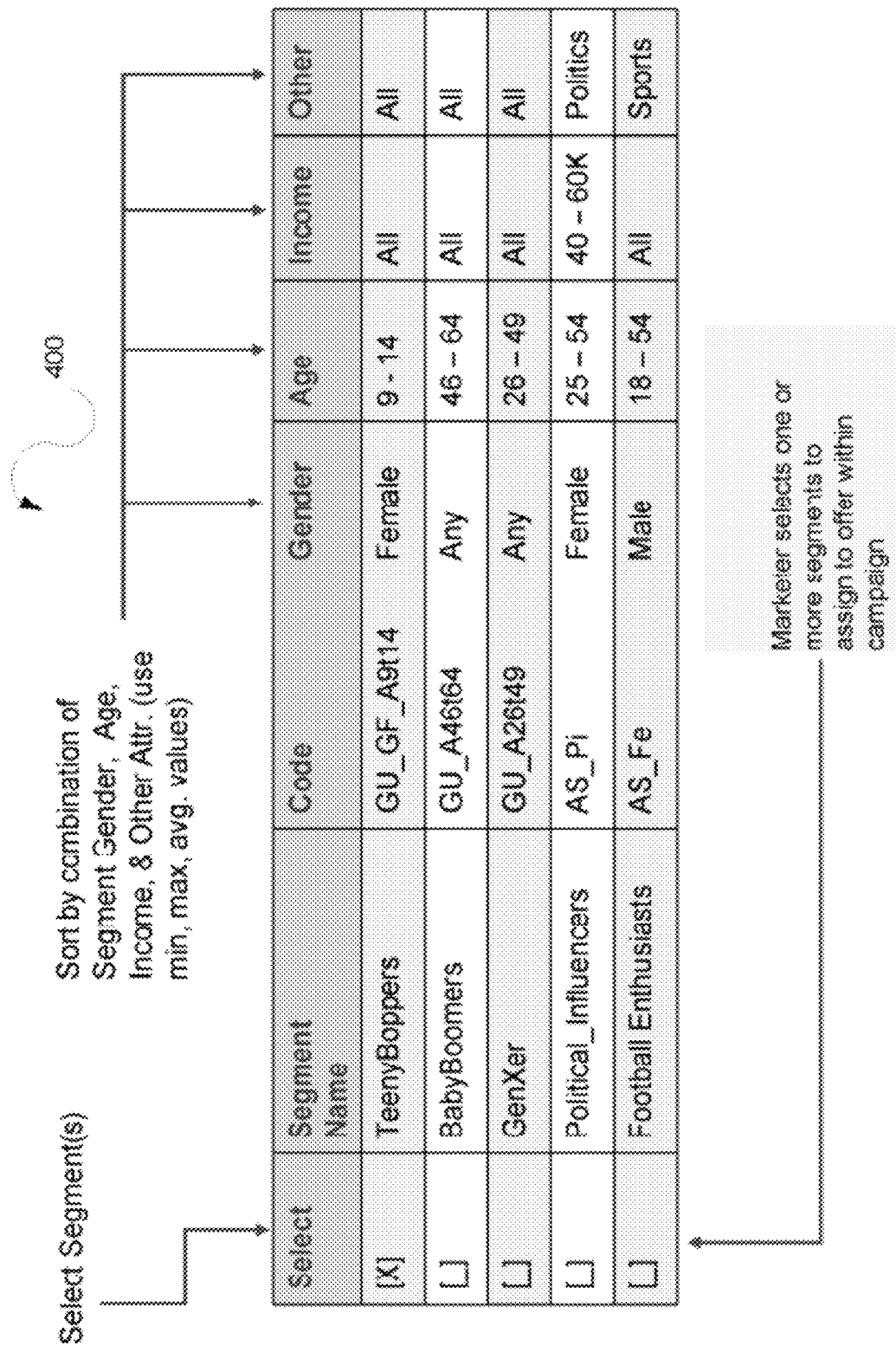
FIG. 4 illustrates an example of a graphical user interface ("GUI") that may be utilized to one more segments.

FIG. 4 illustrates an example of a GUI 400 that may be utilized to define one more segments. As an example, a marketer may select one or more segments to assign to an offer within a campaign from the GUI 400. The GUI 400 has a plurality of segments that may be selected by an input. The segments may each have a segment name, code, gender, age, income, and/or other attributes. Further, the GUI 400 may allow the user to sort by combination of segment gender, age, income, and/or other attributes. Further, minimum, maximum, and/or average values may be utilized.

The micro-segment object utilizes a formal expression syntax, which describes all segment expressions that can be formed and represented. The following is an example segment definition that is provided for a manufacturer interested in targeting consumers who live in certain cities, are a specific gender, have a specified income range, have made previous purchases in certain product categories, etc.:

Consumer lives in Palo Alto, Sunnyvale, Santa Clara, or San Jose (based on Zipcode)
    AND (either of:)
    Consumer is a Male and
    Consumer's Income is between $50K and $100K and
    Consumer's DaraProvider1MonthlyPowerBill>=$200 and
    OR
    Consumer's products of interest are in "Green Electronics" or "Power Conservation" category
    or
    Consumer has purchased products from brands "Brand ABC" or "Brand XYZ"

Figure 5B:
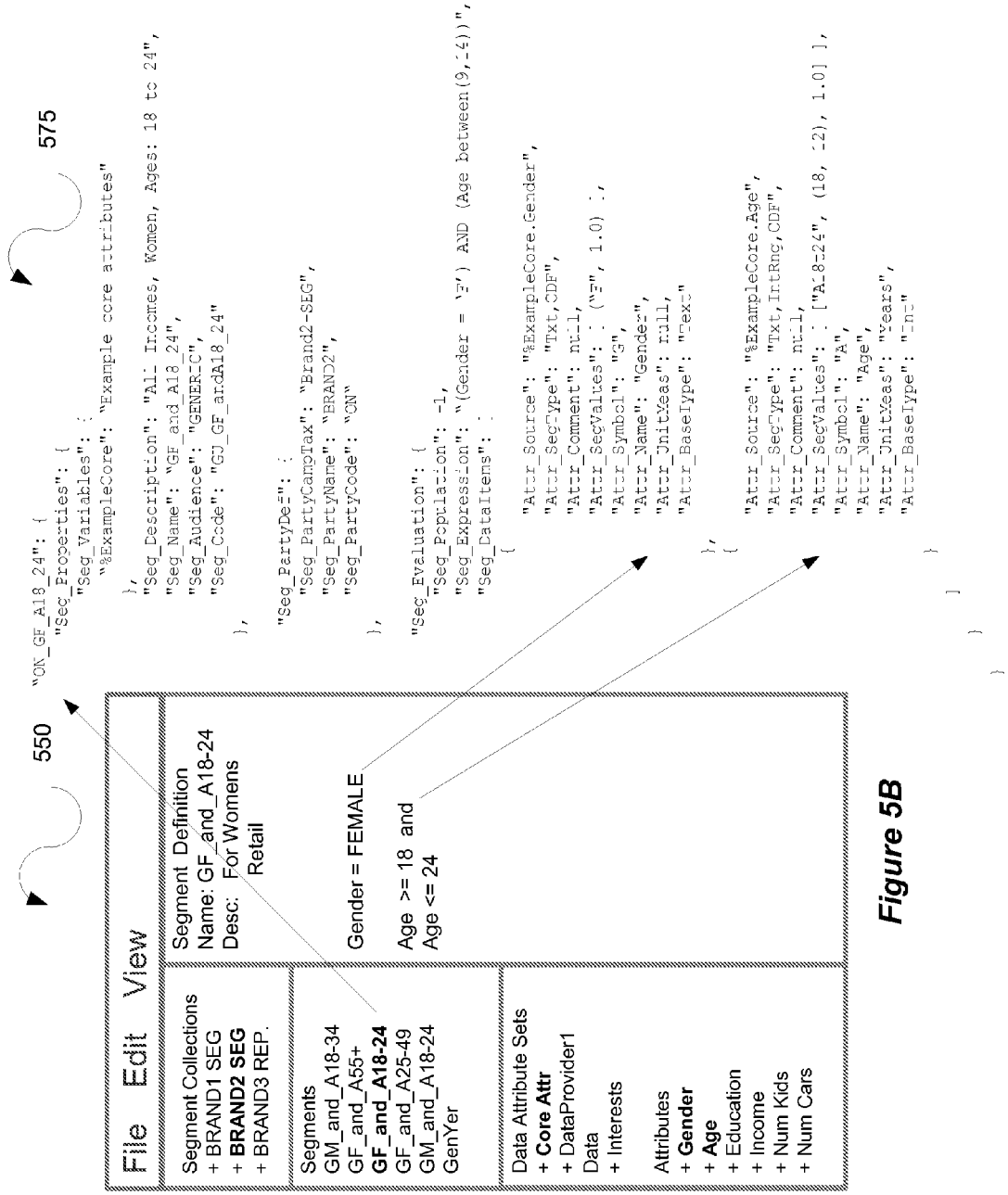
FIG. 5B illustrates an example of a segment GUI in which selections are made such that code generates segment definitions.

All of the conditions in this text description are then expressed as a collection of CONDITIONS or predicates connected by boolean AND and OR operations. FIG. 5A illustrates an example of code 500 for the written form of the expression. In one embodiment, this segment expression can be provided directly to an evaluation and execution engine for evaluation. Further, FIG. 5B illustrates an example of a segment GUI 550 in which selections are made such that code 575 generates segment definitions.

In another embodiment, an expression parse tree based on expression syntax rules is created and provided to the evaluation and execution engine. By utilizing an expression parse tree representation, a parse step is eliminated on each expression match resulting in significantly faster execution of the segment matching expression.

Figure 6:
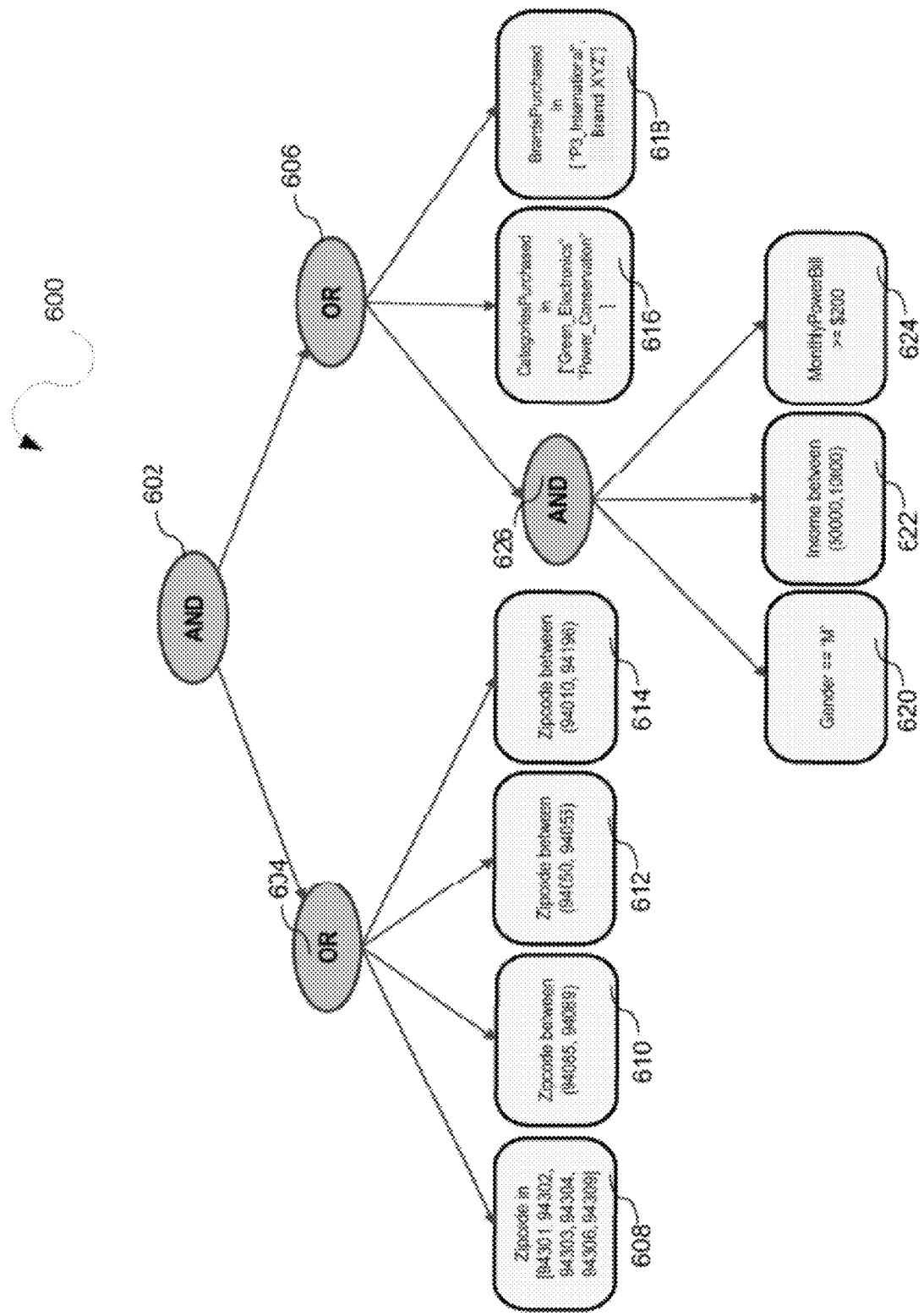
FIG. 6 illustrates an expression tree.

FIG. 6 illustrates an expression tree 600. The expression tree 600 is a tree of nodes that is created by a GUI tool. For example, a marketer who is creating segment definitions may utilize the GUI tool. Simple conditions or predicates specify a consumer attribute, e.g., zipcode, a value or list of values, e.g., 94301, 94302, . . . , and a comparison or set operator, e.g., "in." These individual conditions are evaluated, and the result of each condition is then utilized to satisfy one or more BOOLEAN expressions formed using a combination of AND or OR operators.

The expression tree 600 has a first root AND node 602, a first OR leaf node 604, and a second OR leaf node 606. The first OR leaf node 604 evaluates to TRUE if any of a first zipcode condition 608, a second zipcode condition 610, a third zipcode condition 612, or a fourth zipcode condition 614 is met. Further, the second OR leaf node 606 evaluates to true if a categories purchased condition 616 is met, a brands purchased condition 618 is met, an AND node 626 evaluates to TRUE. The AND node 626 evaluates to TRUE if a gender condition 620 is met, an income condition 622 is met, and a monthly power bill condition is met. The results of the first OR leaf node 604 and the second OR leaf node 606 are utilized to evaluate the AND node 602. Both results have to be TRUE for the AND node 602 to evaluate to TRUE. In other words, after all simple condition nodes are evaluated to either TRUE or FALSE and all immediate boolean nodes are evaluated, parent boolean nodes are evaluated by a recursive process until the root node of the expression tree is reached. At this stage, a final TRUE or FALSE value is returned to the system to determine if the consumer should be assigned into the marketer's defined segment.

In the case when consumer attribute values are missing, conditions cannot be evaluated to be either TRUE or FALSE values and a third value NULL is used. NULL values can subsequently participate in boolean operations by using a three-value logic system.

The expression tree 600 is provided as an example of an expression graph. The expression graph is an acyclic graph. A variety of other types of acyclic graphs may be utilized. An acyclic graph is a structure that is utilized to group the expression predicates. Accordingly, the expression graph groups the expression predicates. The nodes in the acyclic graph may include different syntax elements that form predicates. The acyclic graph guarantees that the expression is a valid expression that may be executed and that there will not be any syntax errors.

FIG. 7 illustrates an example of code 700 that may be utilized for the expression tree 600 illustrated in FIG. 6. The specific values, conditions, node, code, etc. provided for throughout are intended only as examples.

Figure 8:
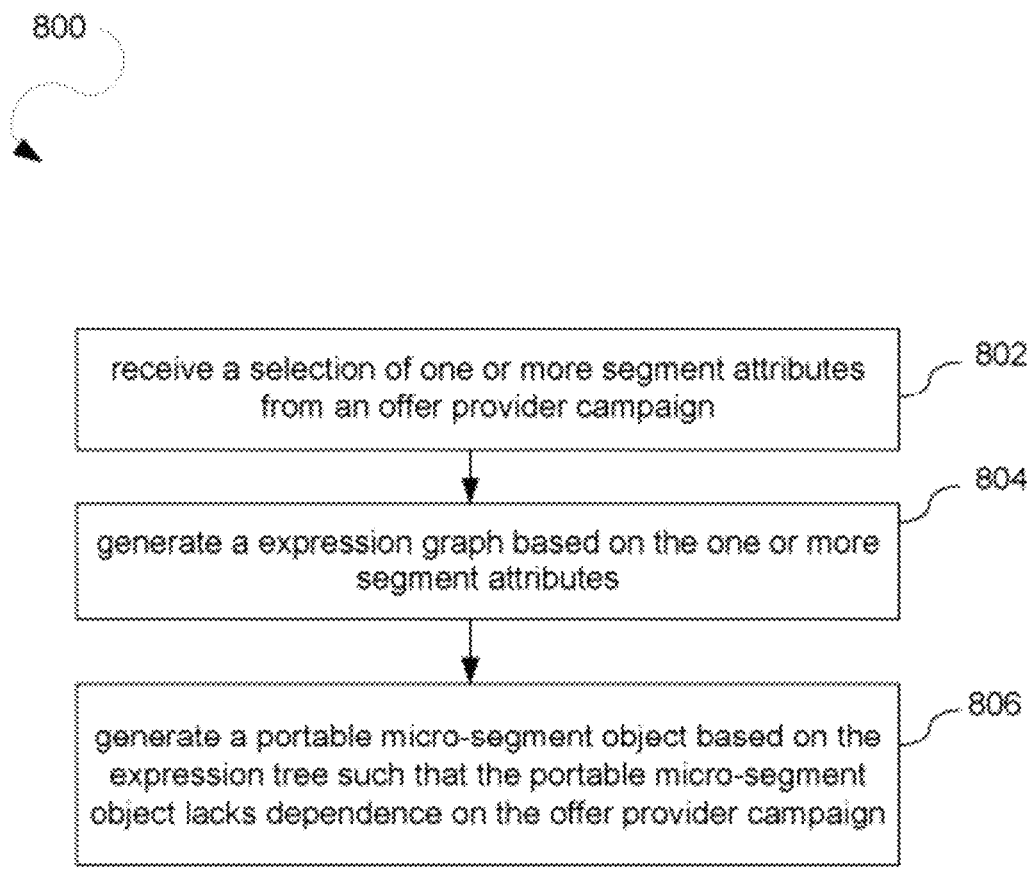
FIG. 8 illustrates a process that is utilized for defining a micro-segment object.

FIG. 8 illustrates a process 800 that is utilized for defining a micro-segment object. At a process block 802, the process 800 receives a selection of one or more segment attributes from an offer provider campaign. In one embodiment, the selection is received at a graphical user interface. In another embodiment, the selection is received from a batch file. The one or more segment attributes define one or more segments that correspond to one or more offers in the offer provider campaign. Further, at a process block 804, the process 800 generates a expression graph based on the one or more segment attributes. In addition, at a process block 806, the process 800 generates a portable micro-segment object based on the expression tree such that the portable micro-segment object lacks dependence on the offer provider campaign. In one embodiment, the expression graph may be a syntactic expression graph.

Figure 9:
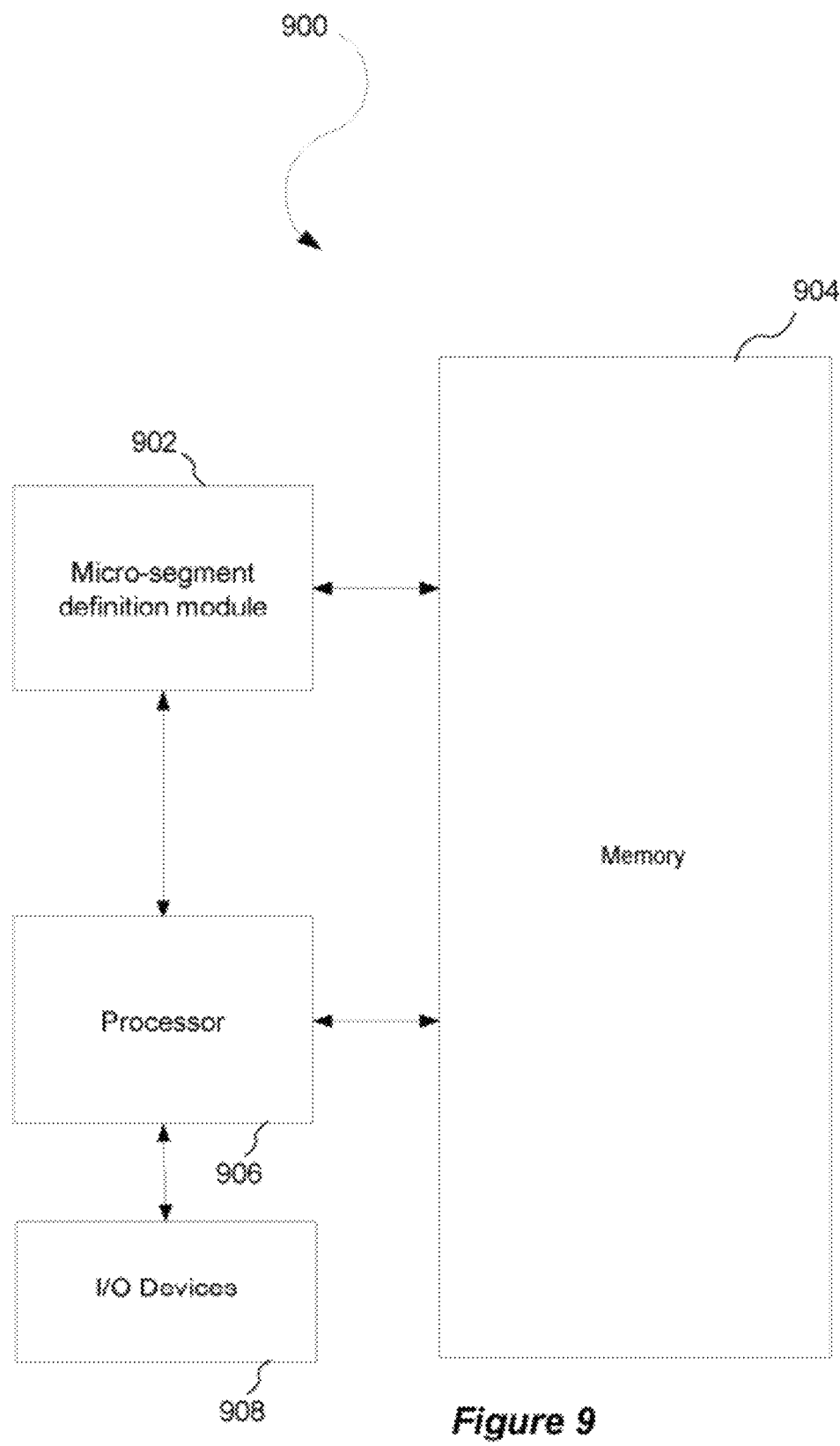
FIG. 9 illustrates a system configuration that may be utilized for defining a micro-segment.

FIG. 9 illustrates a system configuration 900 that may be utilized for defining a micro-segment. In one embodiment, a micro-segment definition module 902 interacts with a memory 904. In one embodiment, the system configuration 900 is suitable for storing and/or executing program code and is implemented using a general purpose computer or any other hardware equivalents. The processor 906 is coupled, either directly or indirectly, to the memory 904 through a system bus. The memory 904 can include local memory employed during actual execution of the program code, bulk storage, and/or cache memories which provide temporary storage of at least some program code in order to reduce the number of times code must be retrieved from bulk storage during execution.

The Input/Output ("I/O") devices 908 can be coupled directly to the system configuration 900 or through intervening input/output controllers. Further, the I/O devices 908 may include a keyboard, a keypad, a mouse, a microphone for capturing speech commands, a pointing device, and other user input devices that will be recognized by one of ordinary skill in the art. Further, the I/O devices 908 may include output devices such as a printer, display screen, or the like. Further, the I/O devices 908 may include a receiver, transmitter, speaker, display, image capture sensor, biometric sensor, etc. In addition, the I/O devices 908 may include storage devices such as a tape drive, floppy drive, hard disk drive, compact disk ("CD") drive, etc. Any of the modules described herein may be single monolithic modules or modules with functionality distributed in a cloud computing infrastructure utilizing parallel and/or pipeline processing.

Network adapters may also be coupled to the system configuration 900 to enable the system configuration 900 to become coupled to other systems, remote printers, or storage devices through intervening private or public networks. Modems, cable modems, and Ethernet cards are just a few of the currently available types of network adapters.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the processes and systems described herein can take the form of entirely hardware embodiments, entirely software embodiments, or embodiments containing both hardware and software elements. If software is utilized to implement the method or system, the software can include but is not limited to firmware, resident software, microcode, etc.

It is understood that the processes and systems described herein may also be applied in other types of processes and systems. Those skilled in the art will appreciate that the various adaptations and modifications of the embodiments of the processes and systems described herein may be configured without departing from the scope and spirit of the present processes, systems, and computer program products. Therefore, it is to be understood that, within the scope of the appended claims, the present processes, systems, and computer program products may be practiced other than as specifically described herein.

We claim:

1. A storage device storing a computer readable program, wherein the computer readable program when executed on a computer causes the computer to perform operations comprising:
   receiving a selection of segment attributes from an offer provider campaign, the segment attributes defining one or more segments that correspond to the offer provider campaign;
   generating an expression tree based on the segment attributes;
   using the expression tree to compare consumer attributes for a specified group of consumers to the segment attributes to determine a number of the consumers that are to be assigned to the one or more segments;
   generating a portable micro-segment object based on the expression tree, the portable micro-segment object including the segment attributes and the number of the consumers assigned to the one or more segments, and lacking dependence on the offer provider campaign;
   sending the portable micro-segment object from a service to an offer provider associated with the offer provider campaign, the service being separate from the offer provider and the portable micro-segment object being sent without identification data for the consumers assigned to the one or more segments;
   receiving at the service an offer from the offer provider, and
   sending the offer from the service to one or more of the consumers assigned to the one or more segments.

2. The storage device of claim 1, wherein the portable micro-segment object stores analytics without user identification data.

3. The storage device of claim 1, wherein at least one of the segment attributes is weighted higher than others of the segment attributes when determining if the consumer is to be assigned to the one or more segments.

4. The storage device of claim 1, wherein the segment attributes include a pre-specified indication of a positive consumer interest in at least one of a particular product or a particular brand.

5. The storage device of claim 1, wherein the segment attributes include a pre-specified indication of a negative interest in at least one of a particular product or a particular brand.

6. The storage device of claim 1, wherein the computer readable program when executed on the computer further causes the computer to evaluate the expression tree based on a three-value logic system.

7. The storage device of claim 1, wherein the micro-segment object includes one or more segment attribute definitions.

8. The storage device of claim 1, wherein the micro-segment object includes one or more segment attribute value definitions.

9. A computer-implemented method comprising:
   receiving a selection of segment attributes from an offer provider campaign, the segment attributes defining one or more segments that correspond to one or more offers in the offer provider campaign;
   generating an expression tree based on the segment attributes;
   comparing, via the expression tree, consumer attributes to the one or more segment attributes to determine a number of consumers to be assigned to the one or more segments;
   generating, via a computing device, a portable micro-segment object based on the expression tree such that the portable micro-segment object includes the segment attributes and the number of consumers assigned to the one or more segments, and lacks dependence on the offer provider campaign;
   sending the portable micro-segment object from a service to an offer provider associated with the offer provider campaign, the service being separate from the offer provider and the portable micro-segment object being sent without identification data for the consumers assigned to the one or more segments;
   receiving at the service an offer from the offer provider; and
   sending the offer from the service to one or more of the consumers assigned to the one or more segments.

10. The method of claim 9, wherein the portable micro-segment object stores analytics without user identification data.

11. The method of claim 9, wherein at least one of the segment attributes is weighted higher than others of the segment attributes when determining if the consumer is to be assigned to the one or more segments.

12. The method of claim 9, wherein the segment attributes include a pre-specified indication of a positive consumer interest in at least one of a particular product or a particular brand.

13. The method of claim 9, wherein the segment attributes include a pre-specified indication of a negative interest in at least one of a particular product or a particular brand.

14. The method of claim 9, further comprising evaluating the expression tree based on a three-value logic system.

15. The method of claim 9, wherein the micro-segment object includes one or more segment attribute definitions.

16. The method of claim 9, wherein the micro-segment object includes one or more segment attribute value definitions.

17. A system comprising:
   a reception module configured to receive a selection of segment attributes from an offer provider campaign, the segment attributes defining one or more segments that correspond to one or more offers in the offer provider campaign; and
   a processor configured to execute computer-executable instructions to perform operations including:
      generating an expression tree based on the segment attributes;
      evaluating the expression tree using consumer attributes to determine a number of consumers to be assigned to the one or more segments;
      generating a portable micro-segment object based on the expression tree such that the portable micro-segment object includes the segment attributes and the number of consumers assigned to the one or more segments, and lacks dependence on the offer provider campaign;
      sending the portable micro-segment object from a service to an offer provider associated with the offer provider campaign, the service being separate from the offer provider and the portable micro-segment object being sent without identification data for the consumers assigned to the one or more segments;

receiving at the service an offer from the offer provider; and sending the offer from the service to one or more of the consumers assigned to the one or more segments.

18. The system of claim 17, wherein the segment attributes include a pre-specified indication of a positive consumer interest in at least one of a particular product or a particular brand.

19. The system of claim 17, wherein the segment attributes include a pre-specified indication of a negative interest in at least one of a particular product or a particular brand.

20. The system of claim 17, wherein the operations further include evaluating the expression tree based on a three-value logic system.

* * * * *

UNITED STATES PATENT AND TRADEMARK OFFICE
CERTIFICATE OF CORRECTION

PATENT NO.       : 8,700,468 B2                           Page 1 of 1
APPLICATION NO.  : 13/039207
DATED            : April 15, 2014
INVENTOR(S)      : Walter Chang et al.

It is certified that error appears in the above-identified patent and that said Letters Patent is hereby corrected as shown below:

In the Claims:

Column 9, Claim 1, Line 35, after "...offer provider" delete "," and insert -- ; --, therefore.

Signed and Sealed this
Fifteenth Day of July, 2014

Michelle K. Lee
*Deputy Director of the United States Patent and Trademark Office*